United States Patent [19]

Tautfest

[11] Patent Number: 4,503,786
[45] Date of Patent: Mar. 12, 1985

[54] GRAIN DRILL WITH SEALED BIN AIR-POWERED DISTRIBUTION

[76] Inventor: Rexford L. Tautfest, Rte. 1, Box 27, Marland, Okla. 74644

[21] Appl. No.: 457,869

[22] Filed: Jan. 14, 1983

Related U.S. Application Data

[63] Continuation-in-part of Ser. No. 219,822, Dec. 24, 1980, abandoned.

[51] Int. Cl.³ .................. A01C 7/00; A01C 15/04
[52] U.S. Cl. .................... 111/86; 222/279; 222/410; 406/68
[58] Field of Search .................. 111/34, 67, 41, 66, 111/1, 73, 77, 80, 85, 86; 222/410, 278, 279; 406/63, 68, 123, 185; 239/655

[56] References Cited

U.S. PATENT DOCUMENTS

| | | | |
|---|---|---|---|
| 611,184 | 9/1898 | Rainey | 111/41 X |
| 1,591,266 | 7/1926 | Bailor | 222/410 |
| 1,770,641 | 7/1930 | Brennan | 111/67 |
| 1,957,594 | 5/1934 | Helm | 222/410 |
| 2,412,121 | 12/1946 | Bradshaw | 222/279 |
| 3,631,825 | 1/1972 | Weiste | 111/11 |
| 3,804,036 | 4/1974 | Seifert | 111/1 |
| 4,024,822 | 5/1977 | Ross et al. | 111/34 |
| 4,037,755 | 7/1977 | Reuter | 221/211 |
| 4,379,664 | 4/1983 | Klein et al. | 111/80 X |

FOREIGN PATENT DOCUMENTS

| | | | |
|---|---|---|---|
| 1043173 | 11/1978 | Canada | 111/34 |
| 1060720 | 8/1979 | Canada | 111/34 |
| 31546 | 7/1912 | Fed. Rep. of Germany | 111/66 |
| 902323 | 1/1954 | Fed. Rep. of Germany | 111/67 |
| 2214106 | 9/1973 | Fed. Rep. of Germany | 111/34 |
| 2519760 | 11/1976 | Fed. Rep. of Germany | 111/34 |
| 1564295 | 4/1969 | France | 111/34 |
| 2233807 | 2/1975 | France | 111/34 |

Primary Examiner—James R. Feyrer
Attorney, Agent, or Firm—Head, Johnson & Stevenson

[57] ABSTRACT

A pnuematic distributing apparatus for seed or other ground receiving particles which has a mobile framework attached to or powered by a vehicle. A large capacity substantially sealed seed bin is disposed on the framework and feeds grain and/or fertilizer into a metering mechanism which deposits seed into a plurality of seed channels which intersect with corresponding pressurized air flow conduits which direct the seeds into outlet tubes adjacent ground furrow openers and deposit the seed into the furrows. Means are provided to block seed channels for selected seeding patterns.

11 Claims, 9 Drawing Figures

GRAIN DRILL WITH SEALED BIN AIR-POWERED DISTRIBUTION

CROSS-REFERENCE TO RELATED APPLICATION

This application is a continuation-in-part of co-pending application Ser. No. 219,822 filed Dec. 24, 1980 entitled "Air-Powered Grain Drill", now abandoned.

BACKGROUND OF THE INVENTION

1. Field of the Invention

The present invention broadly relates to grain or seed drills and, more particularly, to grain drills which are provided with pneumatic means to meter and propel the seeds to open ground furrows.

2. Description of the Prior Art

Due to the hunger of the increasing world's population there is a corresponding increasing demand for more food output per acre. A way of meeting this increased demand is by increasing the efficiency of the farmer. One specific way of increasing the farmer's efficiency is by improved seed planting devices. Numerous generations of mechanized seed planting devices have been developed with each being an advance over the preceeding generation. Currently the majority of planting or seeding is carried out by devices called grain drills which consist of seed boxes attached to a rear portion of plows or furrow openers and deposit seeds at preselected intervals into furrows. These prior art grain drills may also be attached to separate wheeled trailers, but this is generally cost prohibitive.

Due to the extreme localized weight of the seed and the weight of the grain drill on the rear portion of the grain drill plows these prior art grain drills are only manufactured in relatively small units so to be easily carried. The small size of the seed boxes necessitates frequent refilling. Also the greater number of grain drills increases the cost of initial purchase and repair to the farmer. Several small grain drills can be pulled in squandron hitches, but this is cumbersome to operate.

Air powered grain drills have been designed in the past, however each has disadvantages, such as small size, irratic seed delivery and lack of means to selectively block the delivery tubes for specific seeding pattern, for different grains or other seed-like material. Some drills use venturi principles which are open to pick up dirt, dust particles and debris which commonly exist when drilling seed and which have been known to plug such delivery tubes causing underseeding and overseeding.

SUMMARY OF THE INVENTION

A primary object of the present invention is to provide an air-powered grain drill with a large capacity seed box centrally disposed over a mobile frame work.

Another object of the present invention is to provide a grain drill which is carried by a vehicle, i.e. self-propelled or may be trailed behind a vehicle.

Another object of the present invention is to provide a grain drill having an air-powered sealed seed distribution system that is non-jamming, will cause little or no injury to the seed, is sealed from dirt and debris and will not leak grain or seed particles during non-seeding periods.

Another object is to provide control over the metering system as a function of the speed of traverse across the ground and to provide a grain drill which has means to selectively block the delivery tubes for selected seeding patterns.

Other objects of the present invention will become apparent through the reading of the description of the preferred embodiments and viewing of the drawings.

Generally, the present invention is comprised of a central framework having a plurality of wheels attached thereto for rolling movement across the surface of the ground and with a plurality of furrow openers trailing behind and from wings on each side of the framework. A plurality of press wheels are attached to the framework and the wings to close the ground over the seed. A large capacity (e.g. enough for a days planting) air tight substantially sealed seed box or bin is disposed above and attached to the framework and is oriented to supply seed into a plurality of metering mechanisms. The metering mechanisms have channels which intersect horizontal pressurized air flow channels within a seed directing device. The seed directing device is in communication with a forced air device, such as a centrifugal blower or fan, which forces air into the horizontal air flow channels and propels the metered seed out of the air flow channels into the outlet seed tubes which extend out to and adjacent the furrow openers. The seed directing device is essentially a longitudinal square or rectangular plenum with a plurality of openings along one side, each opening of which connects with or forms each air flow channel. The outlet of the blower directs pressurized air into the plenum transversely to the axis of the openings. A baffle within the plenum creates substantially equal air flow into each opening. The blower is driven by a power take-off or a separate power source. As the grain drill is moved across the surface of the ground, seed is deposited within each of the furrows at metered intervals and as a function of the speed of travel. The outlet seed tubes provide a relatively straight path for proper and continuous seeding.

Each of the metering mechanisms is provided with a gate or other blocking means in order to selectively block seed from entering the metering mechanism for selected seeding patterns.

DETAILED DESCRIPTION OF THE PREFERRED EMBODIMENT

Before explaining the present invention, in detail, it is to be understood that the invention is not limited in its application to the details of construction and arrangement of parts illustrated in the accompanied drawings, since the invention is capable of other embodiment and being practiced or carried out in a variety of ways. Also, it is to be understood that the phraseology or terminology employed herein is for the purpose for description and not of limitation.

Figure 1:
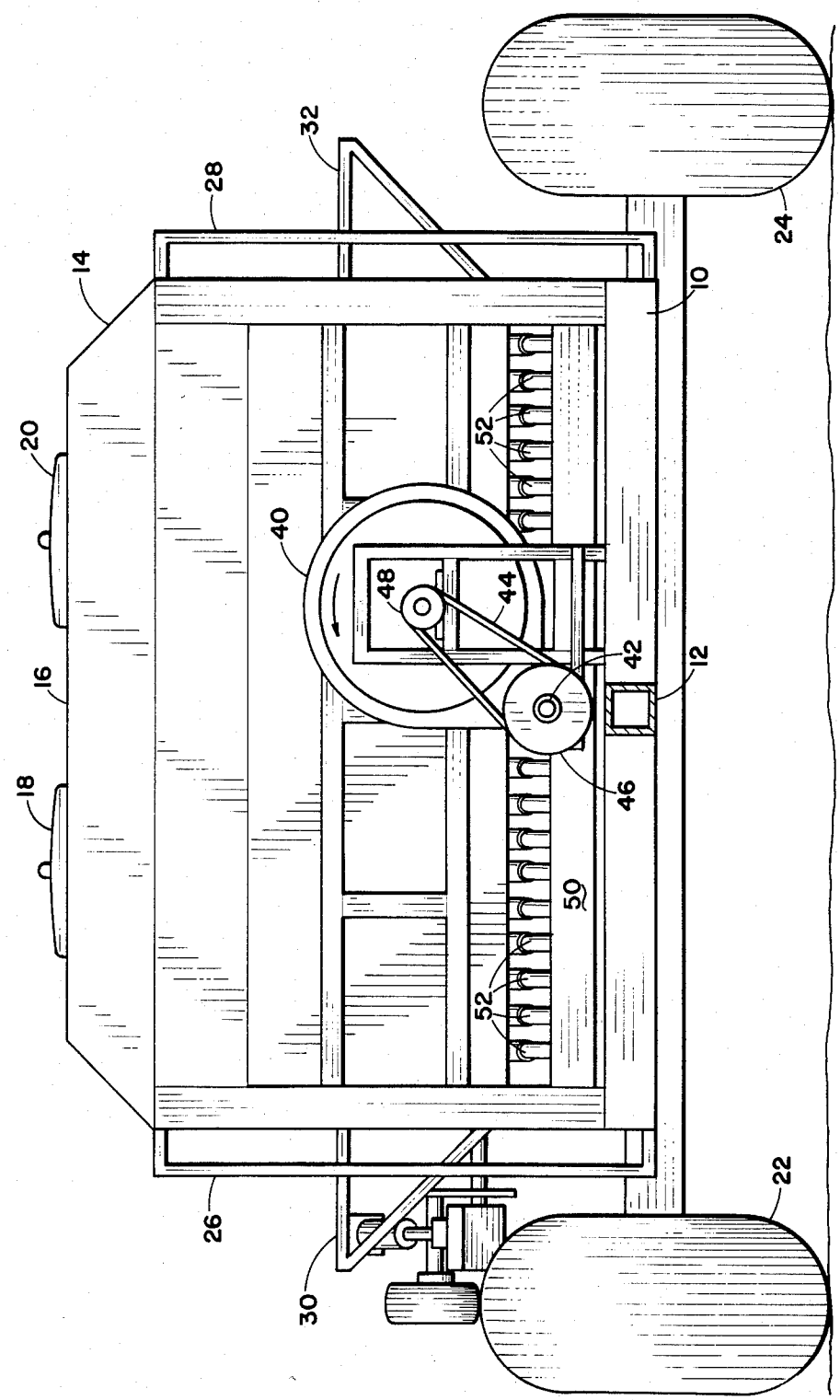
FIG. 1 is a front elevational view of the apparatus of this invention taken from the tractor side.
Figure 2:
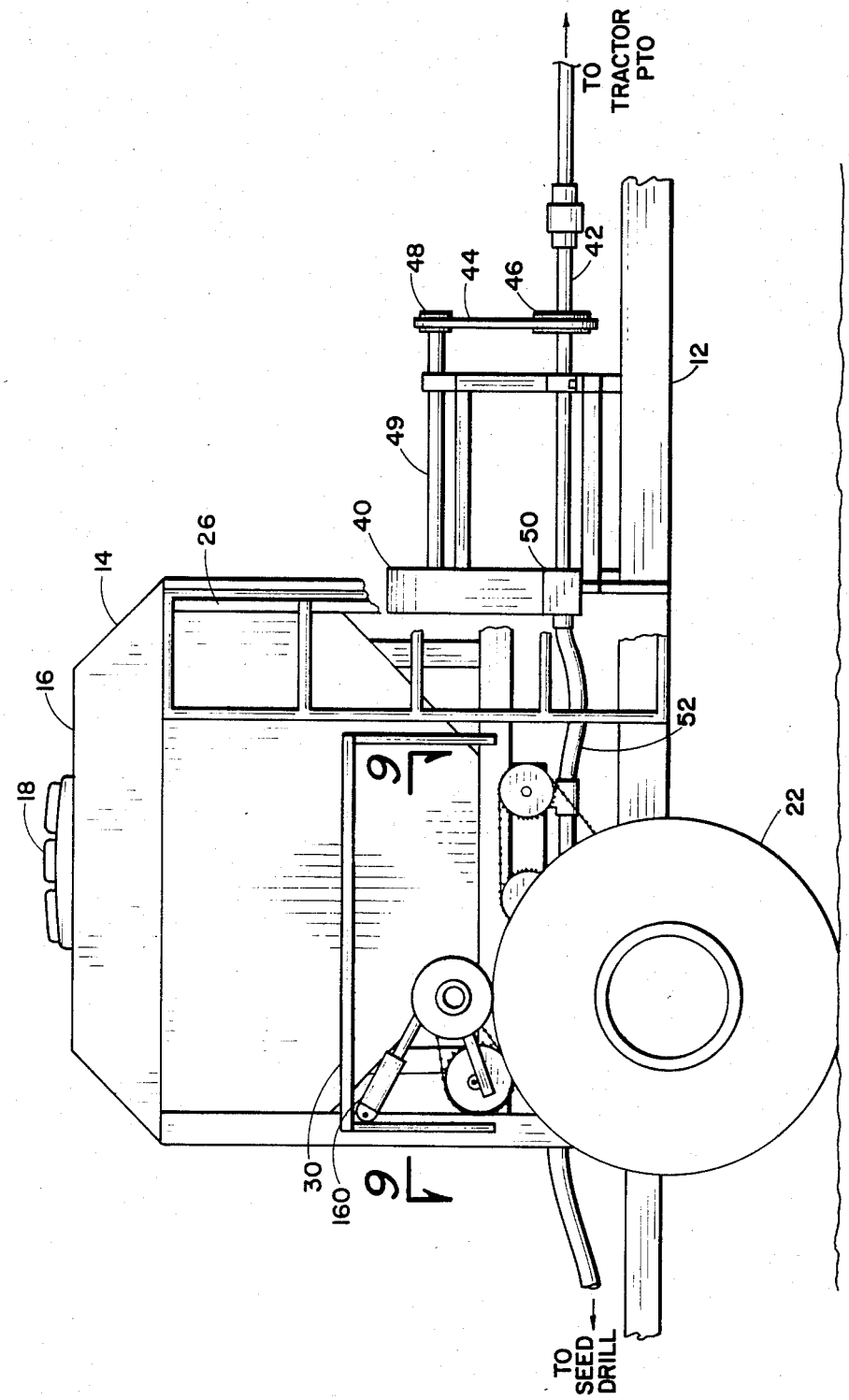
FIG. 2 is a left side elevational view.
Figure 3:
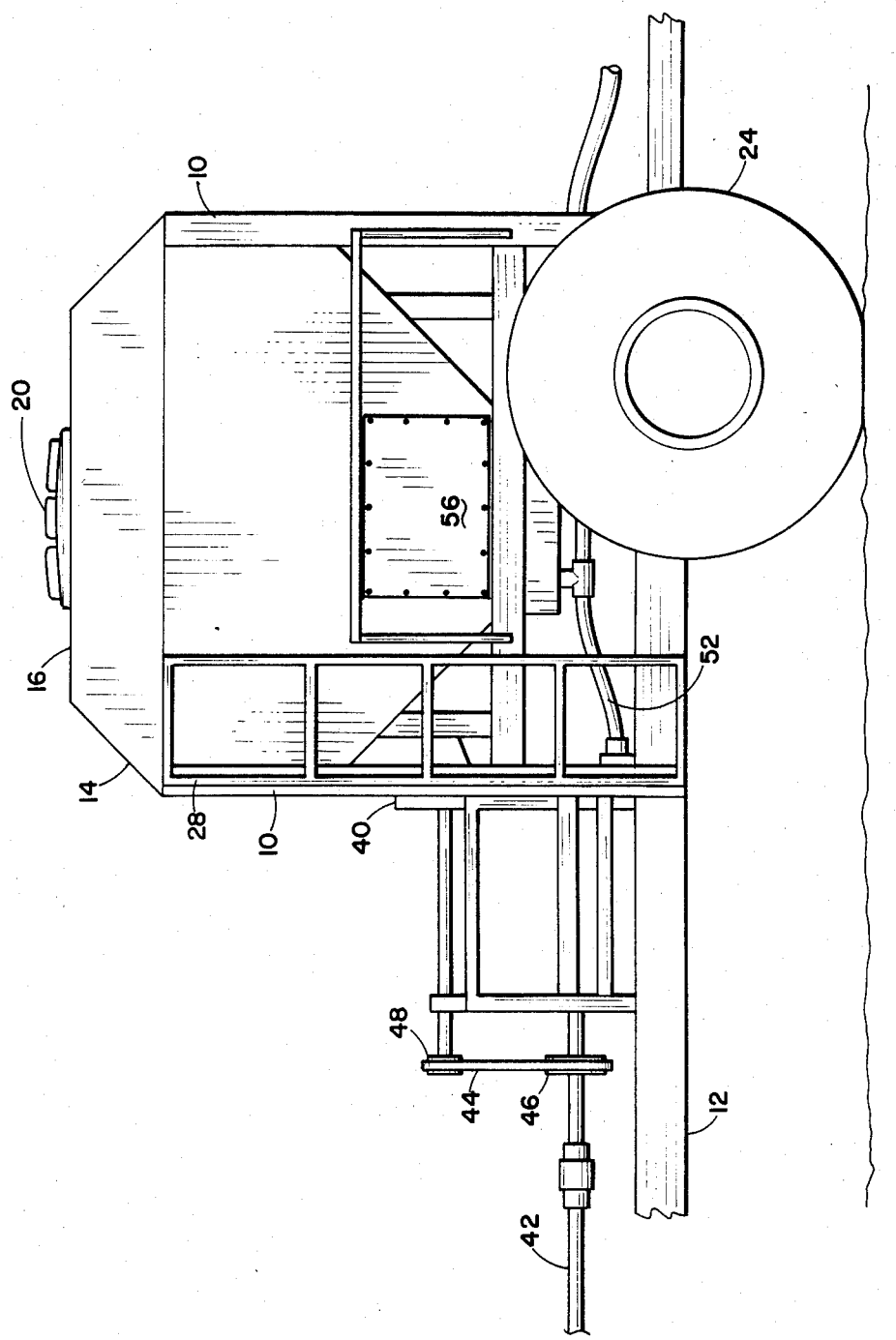
FIG. 3 is a right side elevational view.
Figure 4:
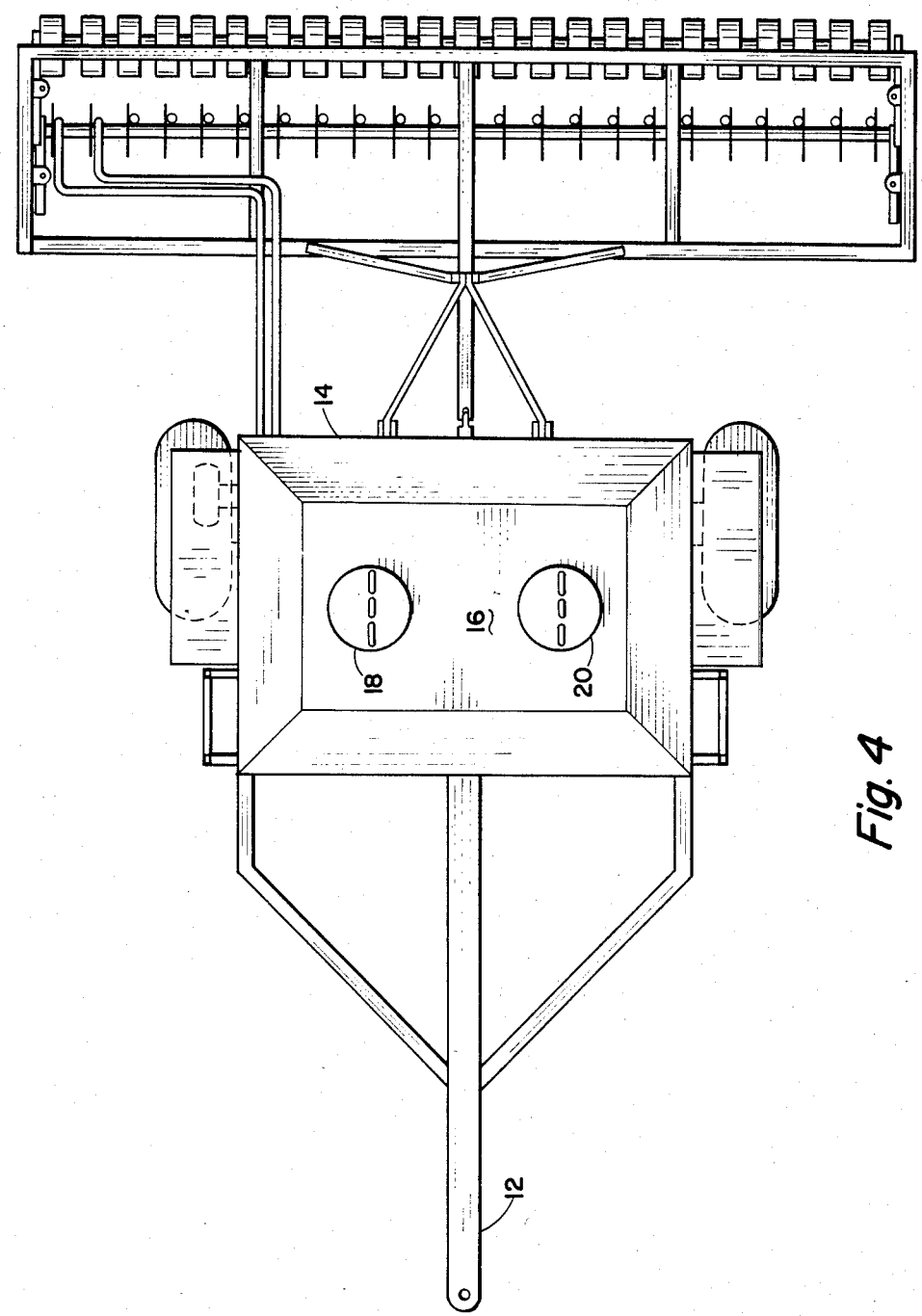
FIG. 4 is top elevational view of the apparatus, including a plan view of the tandem grain drill during the planting position.

Referring now to FIG. 1, the apparatus that is shown when viewed from the tractor side looking toward the trailing or rear thereof. Behind the apparatus, not shown in FIGS. 1, 2 or 3, is a trailing seed drill unit of a type that is well known to those skilled in the art. The apparatus comprises a framework 10 which includes a tongue 12 for attachment to the tractor. The framework has attached thereto, a seed bin 14 having one or more openings at its top 16 which are sealably closed by lids 18 and 20. The framework is supported by ground engaging wheels 22 and 24. The seed bin includes ladders 26 and 28 on each side thereof for use by the operator especially during the filling of the seed bin 14. Stands 30 and 32 are provided for the operator to stand during the filling operation and to seal the bin with lids 18 and 20. At the forward side of the apparatus is a blower 40 which, in this instance, is driven by a power take-off shaft 42 from the tractor with the rotary force being transmitted by way of a belt 44 which interconnects sheaves 46 and 48, the latter of which is attached to the shaft 49 of the centrifugal blower 40. The outlet of the blower is directed into a longitudinal plenum 50 which on the backside or downstream side thereof includes a plurality of conveying conduits 52 which direct air therethrough to the metering system, hereafter described, and, which picks-up the seed for delivery to each of the seed drill units for planting.

As shown in FIG. 3, an access door 56 is provided to the interior of the bin if required for any reason.

Figure 5:
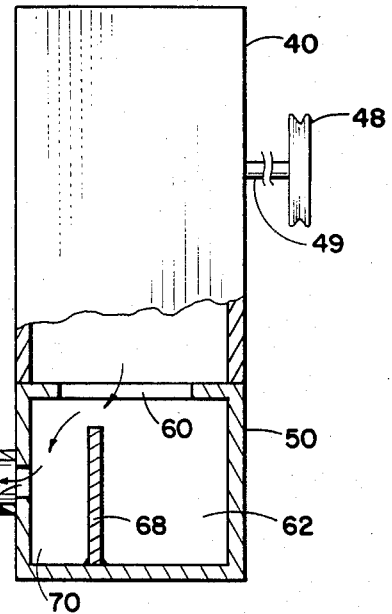
FIG. 5 is a partial sectional view of the air blower and plenum portions of the seed conveying system.

Referring now to FIG. 5, the longitudinal plenum 50 is shown in cross-section. The blower 40 being attached thereto has its outlet aligned with an opening 60 on the top side of the plenum wherein the air will enter into the chamber 62. On the rear or downstream side of the plenum 50 are found a plurality of openings 64 to which sleeve 66 and the outlet air conveying conduits 52 are attached. Interiorly of the plenum chamber 62 is a vertical baffle 68 which extends upwardly from the bottom of plenum chamber to a point below the top, yet above the opening 64 leaving a space 70 therein between the opening 64 and the baffle 68. The baffle 68 extends longitudinally within the plenum at least the length of blower opening 60 and is provided to assure and create a substantially equal air pressure traversing through tubes 52, especially in those openings 64 which are closely adjacent the blower outlet opening 60.

Figure 6:
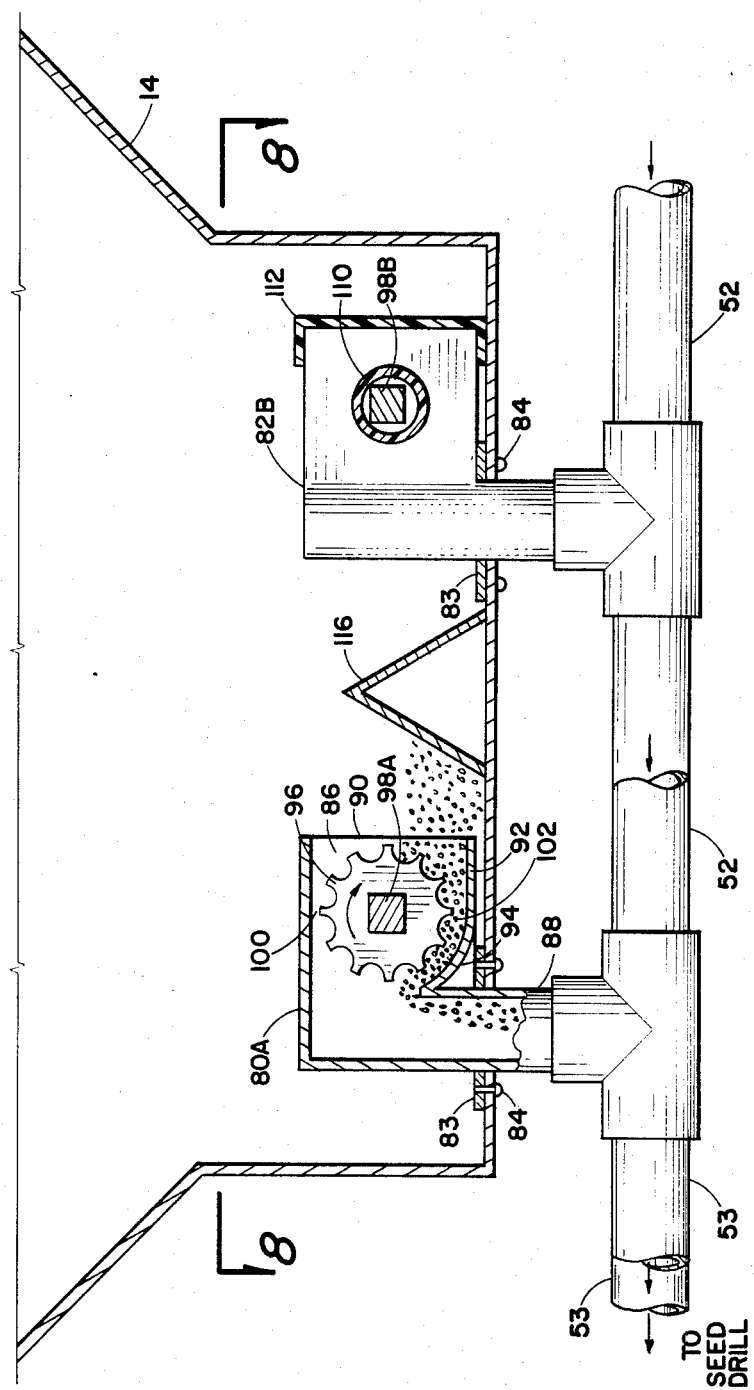
FIG. 6 is a partial sectional view of the seed metering means located downstream of the air-blower and plenum.

Referring now to FIG. 6, the seed metering means is shown. At an accessible location in the bottom of seed bin 14 are a plurality of seed cups 80 longitudinally aligned in row A and seed cups 82 aligned in row B. The cups are attached to the bottom of the bin by means of a flange plate 83 and a plurality of fasteners 84, although other means known in the art may be used to secure the cups to the bin. Each cup is identical and includes a P-shaped housing having a loop portion 86 and a stem portion 88 which housing is open at the front of the loop at 90. The bottom of the loop portion includes a straight section 92 and a curved fillet section 94. A star wheel 96 is attached to shaft 98, either as a square shaft or keyed to a rounded shaft for rotation as shown. The star wheel 96 is so located within the loop portion housing 86 so as to provide a substantial seal at the top 100 while permitting grain to pass through the lower portion 102 relative to the bottom plate 92 and 94 so that grain or seed will be carried in the manner shown into the stem conduit 88 which then connects to the air conveying conduit 52 which then carries the seed via conduit 53 to the seed drill. Between each of the seed cups 80 and 82, in the event a square drive shaft is used, a loosely fitting PVC conduit 110 is placed, which has been found to be effective to prevent interference and friction of the rotating shaft 98, as would otherwise occur if exposed to the grain within bin 14.

As shown in FIG. 6, a typical seed cup cover 112, e.g. formed of a plastic material, is retained or snapped over the open end of the loop portion in the event selective rows of seed planting is necessary or desired for different corps. Suitable interior baffling 116 is shown as a means to deflect the grain in its downward movement into the opening 90 of the seed cups.

Figure 7:
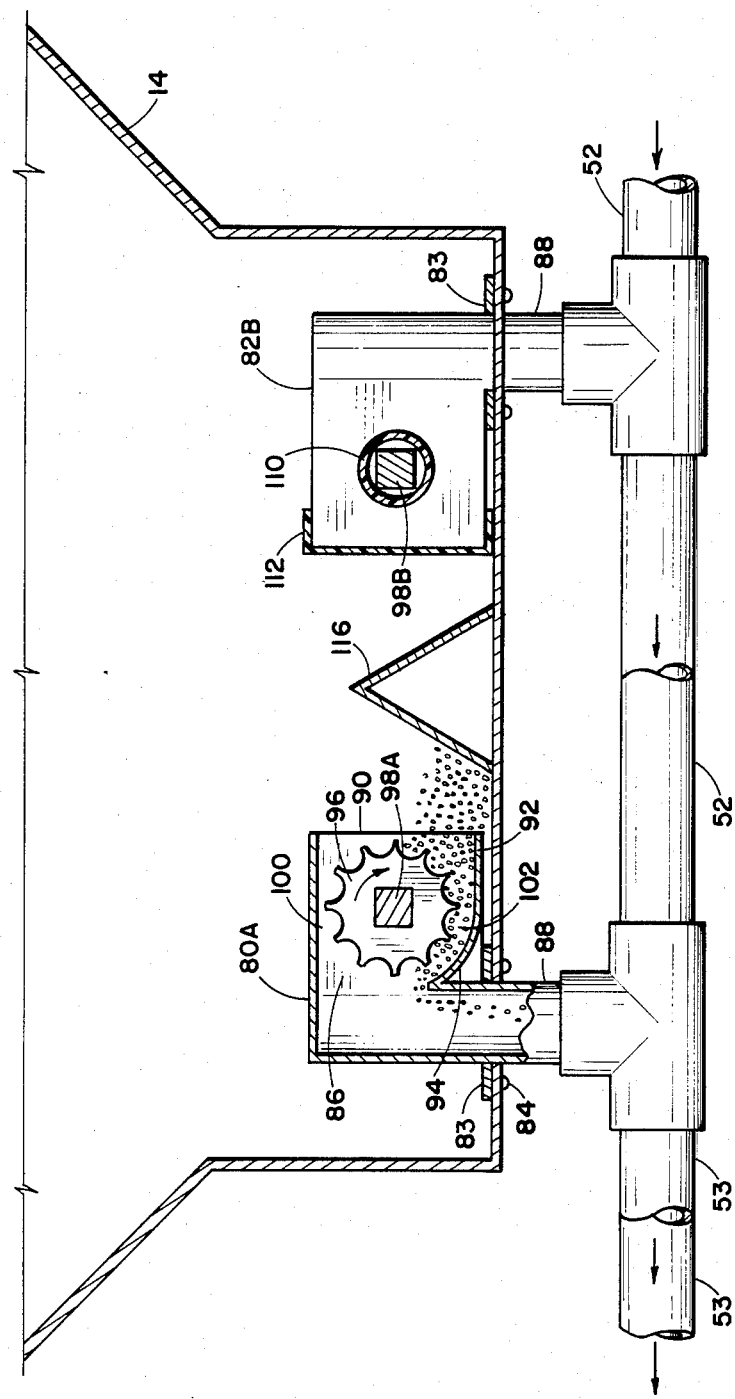
FIG. 7 is a partial sectional view similar to FIG. 6 of another embodiment.

FIG. 7 is an alternate embodiment of the invention wherein the seed cups are directed inwardly toward each other, otherwise identical numbers are used herein to identify identical parts as previously described. Suitable power transmission means is used to cause the shaft rotation to occur in the proper feed direction.

Figure 8:
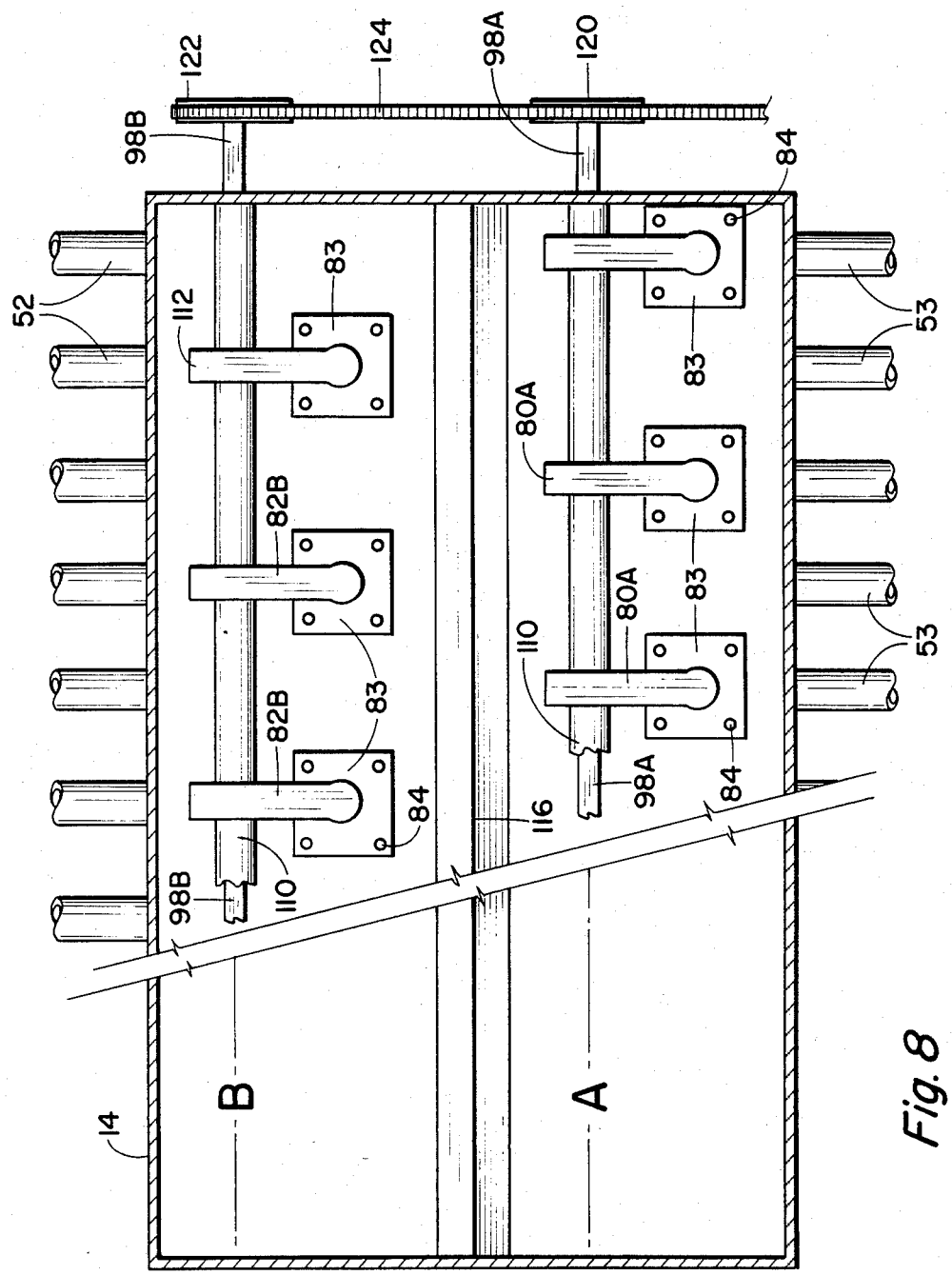
FIG. 8 is a sectional view taken along the line 8—8 of FIG. 6.

FIG. 8 is a cross sectional view taken along the lines 8—8 of FIG. 6 and describes the view looking toward the seed cups placed in the bottom of bin 14. As noted, the seed cups 80 are staggered relative to seed cups 82. Each of the drive shafts 98A and 98B are attached to suitable and respective sprockets 120 and 122 driven, in this instance, by a chain 124 as hereafter schematically described in FIG. 9.

Figure 9:
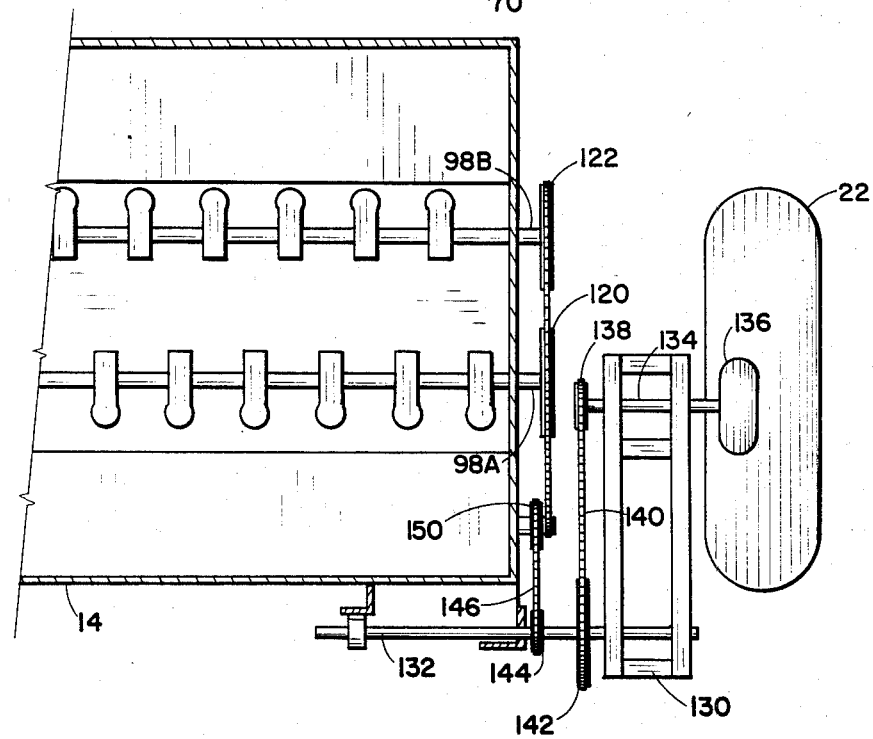
FIG. 9 is a top schematic like view of the drive mechanism used to operate the seed metering means.

FIG. 9 is a schematic of one means of driving the metering cup shafts and includes a plate 130 which is pivotally attached to shaft 132 which is suitably held to the framework 10 or to the bin 14. At the other end of the plate 130 is a shaft 134 which is rotatably attached to the plate and includes a small diameter tire 136 frictionally engaged with the ground engaging wheel 22 of the device of this invention. At the other end of the shaft 134 is a sprocket 138 which interconnects by way of chain 140 to sprocket 142 which rotates shaft 132. A sprocket 144 in turn includes a chain 146 which operates to rotate metering sprocket 120 and 122. A speed increaser or reducer 150 may be appropriately interposed to change the speeds of the shafts 98A and 98B. A hydraulic cylinder and piston means 160 is used to engage or disengage the tire 136 from the ground wheel 22.

Certain modifications are within the scope of the invention as described and claimed herein. These include a concept of the seed bin and metering apparatus being a self-propelled device instead of being drawn by a tractor as shown herein. In addition, although the embodiments of FIGS. 6 and 7 herein show a variety of ways in which the metering cups may be placed at the bottom of the seed bin, another embodiment includes directing seed cups outwardly of each other. A variety of star wheel embodiments may be utilized in the invention and placed within the seed cups, depending upon the size of the grain and/or the amount of metering desired, merely by removing shaft 98 and replacing the desired star wheel therein.

What is claimed is:

1. A seed cup for metering particulate matter comprising a sealed bin for said particulate matter and a pneumatic seed conveying conduit therebelow, a P-shaped housing defining a bowl portion connected to a vertical stem portion, said bowl portion of said P- shaped housing sealably positioned inside at the bottom of said bin, an opening at the front of said bowl portion exposed to said particulate matter said stem portion of said P-shaped housing being a conduit that extends below said bowl portion sealably outward the bottom of said bin and transversely connected to said seed conveying conduit, a star wheel positioned in said bowl portion behind said opening, and means to rotate said star wheel wherein particulate matter will be directed by said star wheel along the bottom of said housing into said conduit forming said stem portion.

2. Apparatus of claim 1 including means to removably cover said opening.

3. In an apparatus for pneumatically dispensing particulate material to seed drill units operable and drawn across the ground by a source of power, comprising:

a frame supported by ground engaging wheels, said frame bearing grain drill units;

a seed bin on said frame having an opening at its top to receive said seed and means to sealably close said opening;

a plurality of seed metering means extending across a bottom of said bin in a transverse plane to the direction of travel, each metering means comprising on assembled seed cup portion and a dispensing conduit, the seed cup sealably positioned inside said bin and comprising a housing, a seed inlet opening at a vertical side opposite said dispensing conduit of said housing, said opening in a vertical plane parallel to said transverse plane, a star wheel positioned in said housing between said opening and said dispensing conduit, said dispensing conduit extending vertically downward through the bottom of said bin;

square shaft means interconnected to each of said star wheels, and means to rotate said shaft means relative to said travel across the ground wherein individual seed particles will be directed by said star wheel along the bottom of said housing into said dispensing conduit;

a tube loosely surrounding exposed portions of said shaft means that are between each seed cup portion; and a pneumatic seed conveying system comprising a plurality of conveying conduits each transversely connected to each dispensing conduit for carrying said seed rearwardly of said seed bin, to said grain drill units, means forward of said seed bin to supply pressurized air to each of said conveying conduits comprising a rectangular enclosed plenum, a plurality of openings on the rearward side of said plenum, each opening connected to each conveying conduit, an opening on the top side of said plenum to receive an outlet from an air blower means, a vertical baffle inside said plenum and extending upward from the bottom above and forward of said openings whereby said air will enter each conveying conduit at substantially the same pressure.

4. The apparatus of claim 1 wherein said means to rotate said shaft is by means interconnected to at least one of said ground engaging wheels.

5. The apparatus of claim 1 including means to cover selected seed inlet openings.

6. Apparatus of claim 1 wherein there are two rows of said seed cups each seed cup in one row transversely off-set to said seed cup in the other row.

7. Apparatus of claim 6 wherein said seed inlet openings in both rows face inwardly.

8. Apparatus of claim 7 including an inverted V-shaped baffle between said rows.

9. Apparatus of claim 6 wherein said seed inlet openings in both rows face outwardly.

10. Apparatus of claim 6 wherein said seed inlet openings in both rows face the same direction.

11. In an apparatus for pneumatically dispensing particulate material to seed drill units operable and drawn across the ground by a source of power, comprising:

a frame supported by ground engaging wheels, said frame bearing grain drill units;

a seed bin on said frame having an opening at its top to receive said seed and means to sealably close said opening;

a plurality of seed metering means extending across a bottom of said bin in a transverse plane to the direction of travel, each metering means comprising on assembled seed cup portion and a dispensing conduit, the seed cup sealably positioned inside said bin and comprising a housing, a seed inlet opening at a vertical side opposite said dispensing conduit of said housing, said opening in a vertical plane parallel to said transverse plane, a star wheel positioned in said housing between said opening and said dispensing conduit, said dispensing conduit extending vertically downward through the bottom of said bin;

shaft means interconnected to each of said star wheels, and means to rotate said shaft means relative to said travel across the ground wherein individual seed particles will be directed by said star wheel along the bottom of said housing into said dispensing conduit; and a pneumatic seed conveying system comprising a plurality of conveying conduits each transversely connected to each dispensing conduit for carrying said seed rearwardly of said seed bin to said seed drill unit, means forward of said seed bin to supply pressurized air to each of said conveying conduits comprising a rectangular enclosed plenum, a plurality of openings on the rearward side of said plenum, each opening connected to each conveying conduit, an opening on the top side of said plenum to receive an outlet from an air blower means, means to maintain said air in each conveying conduit at substantially the same pressure.

* * * * *